UNITED STATES PATENT OFFICE.

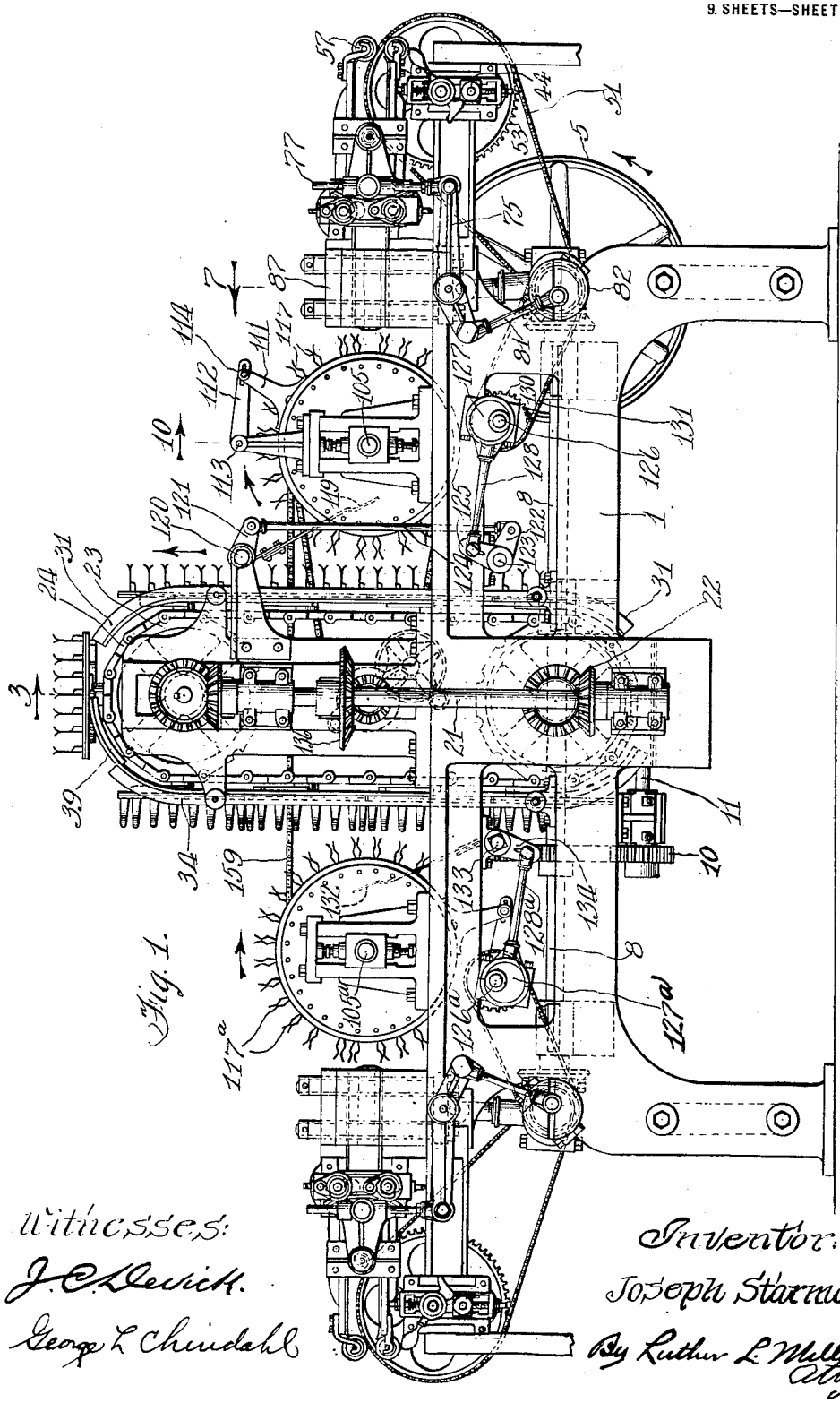

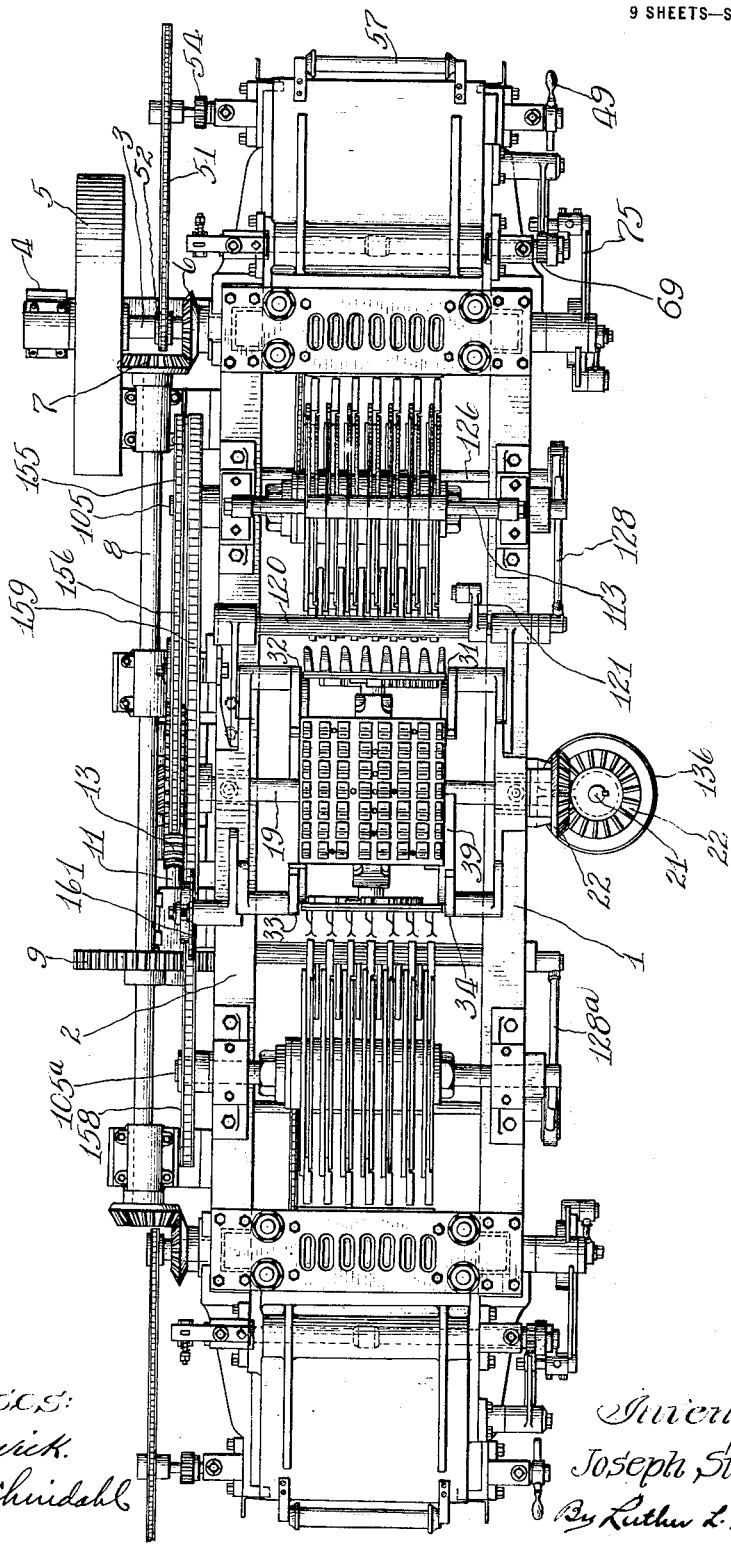

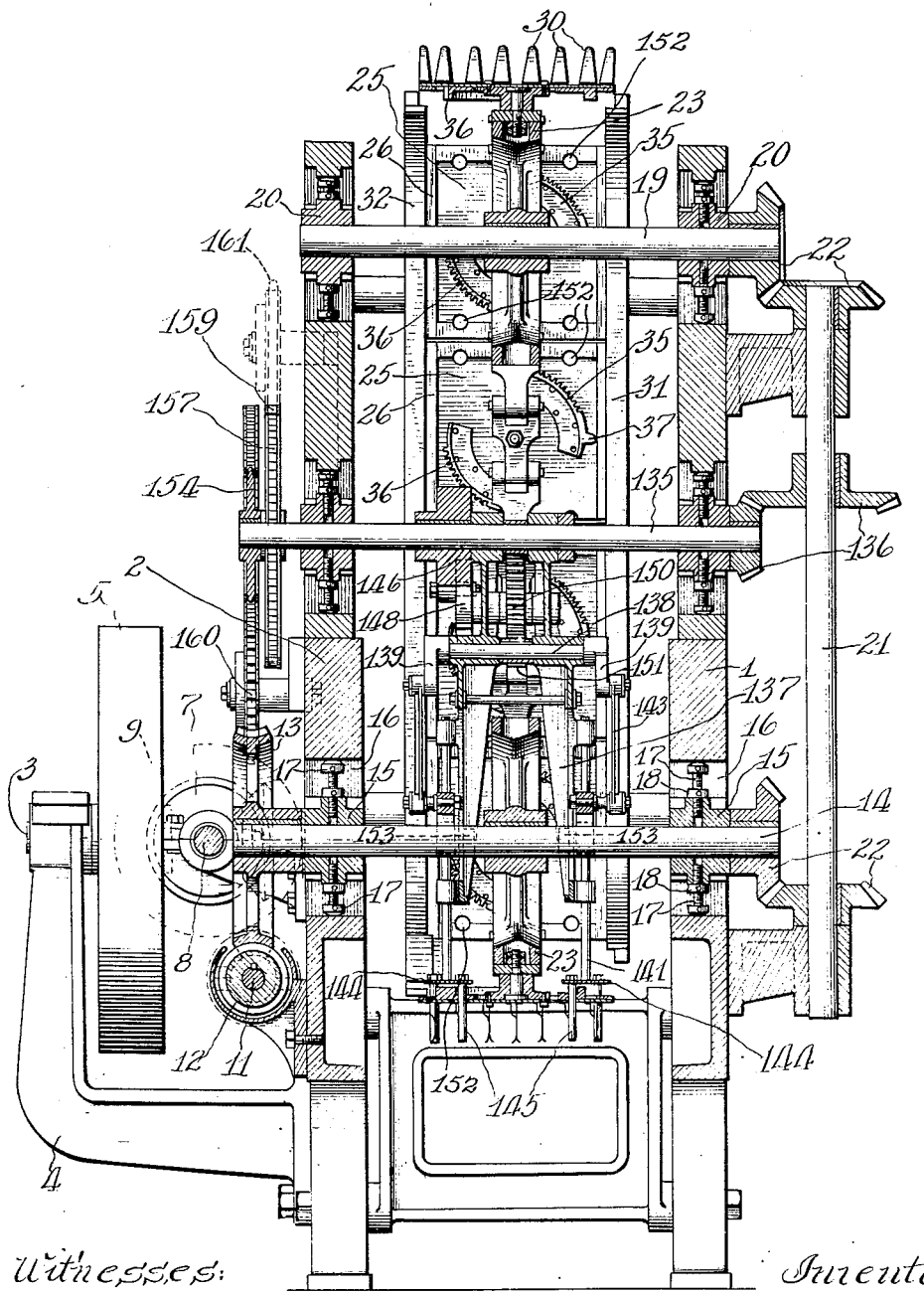

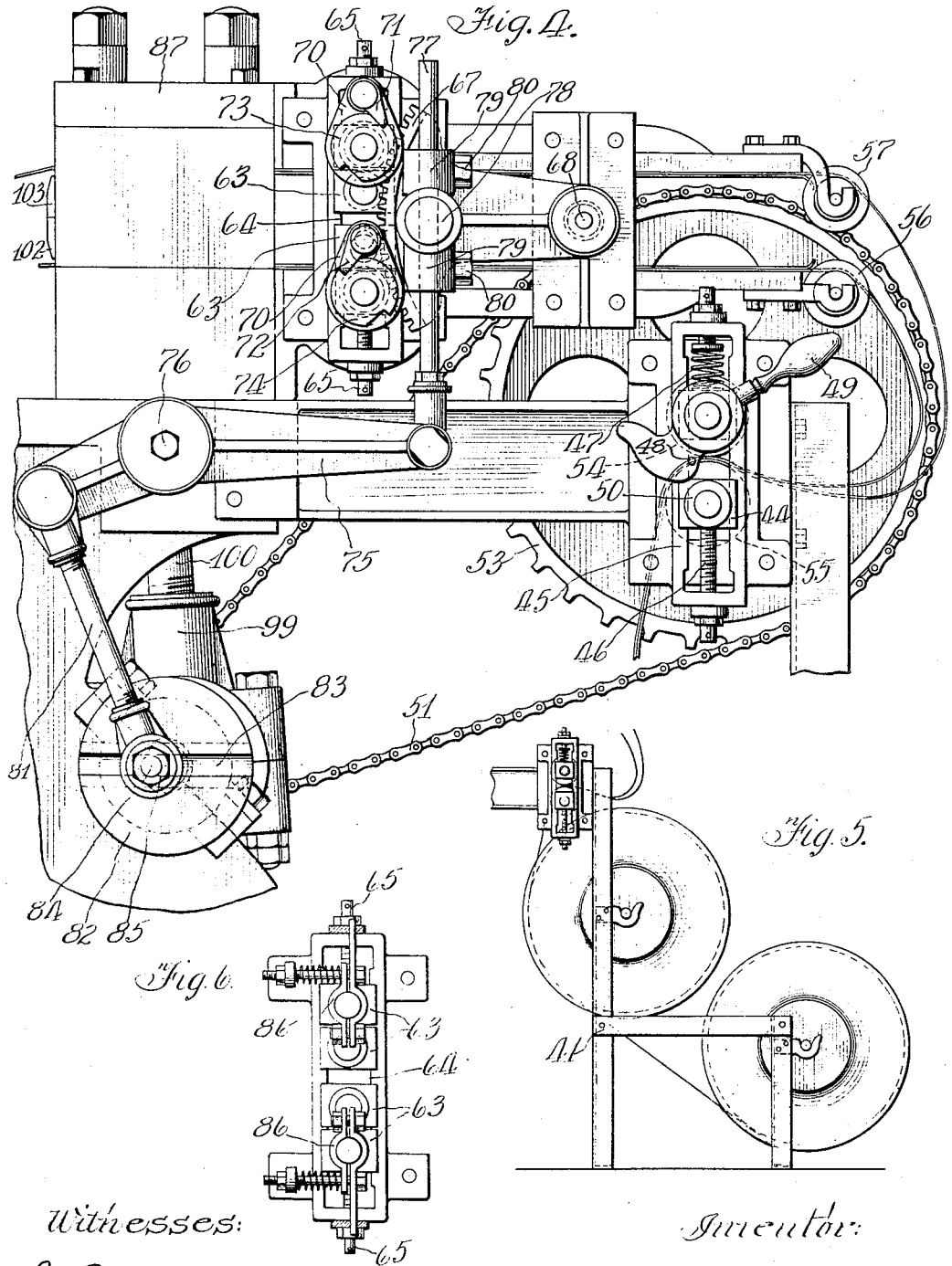

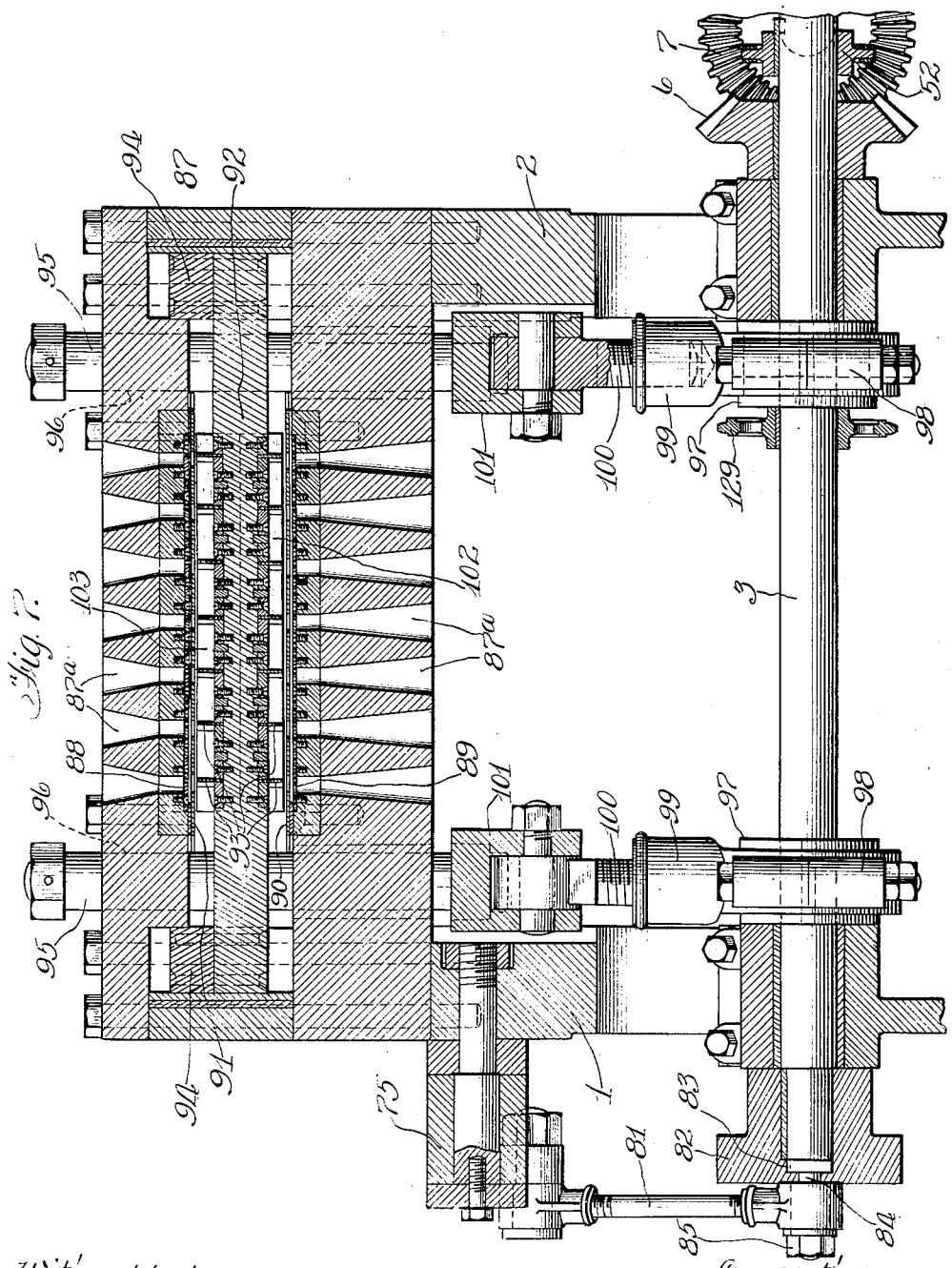

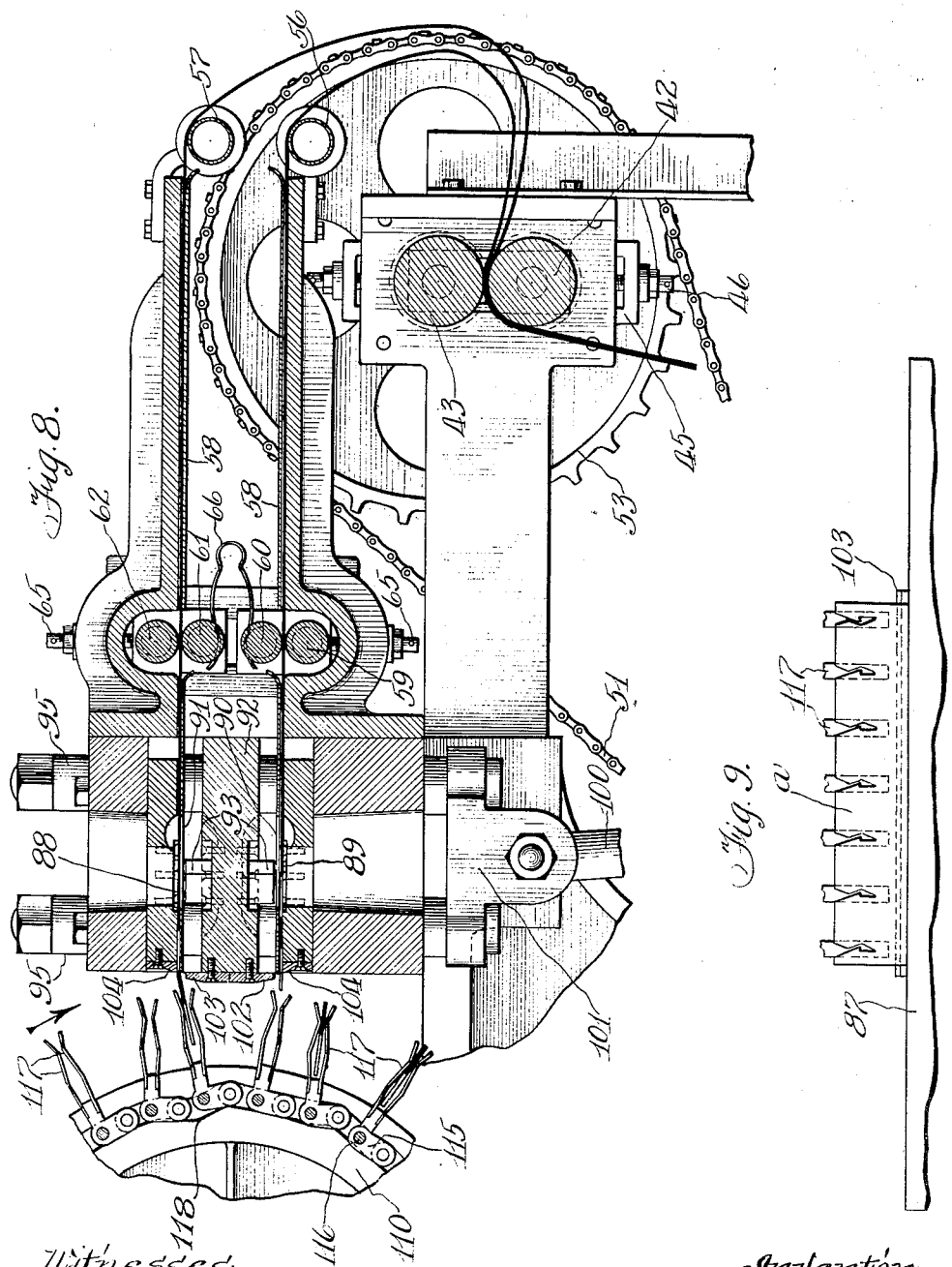

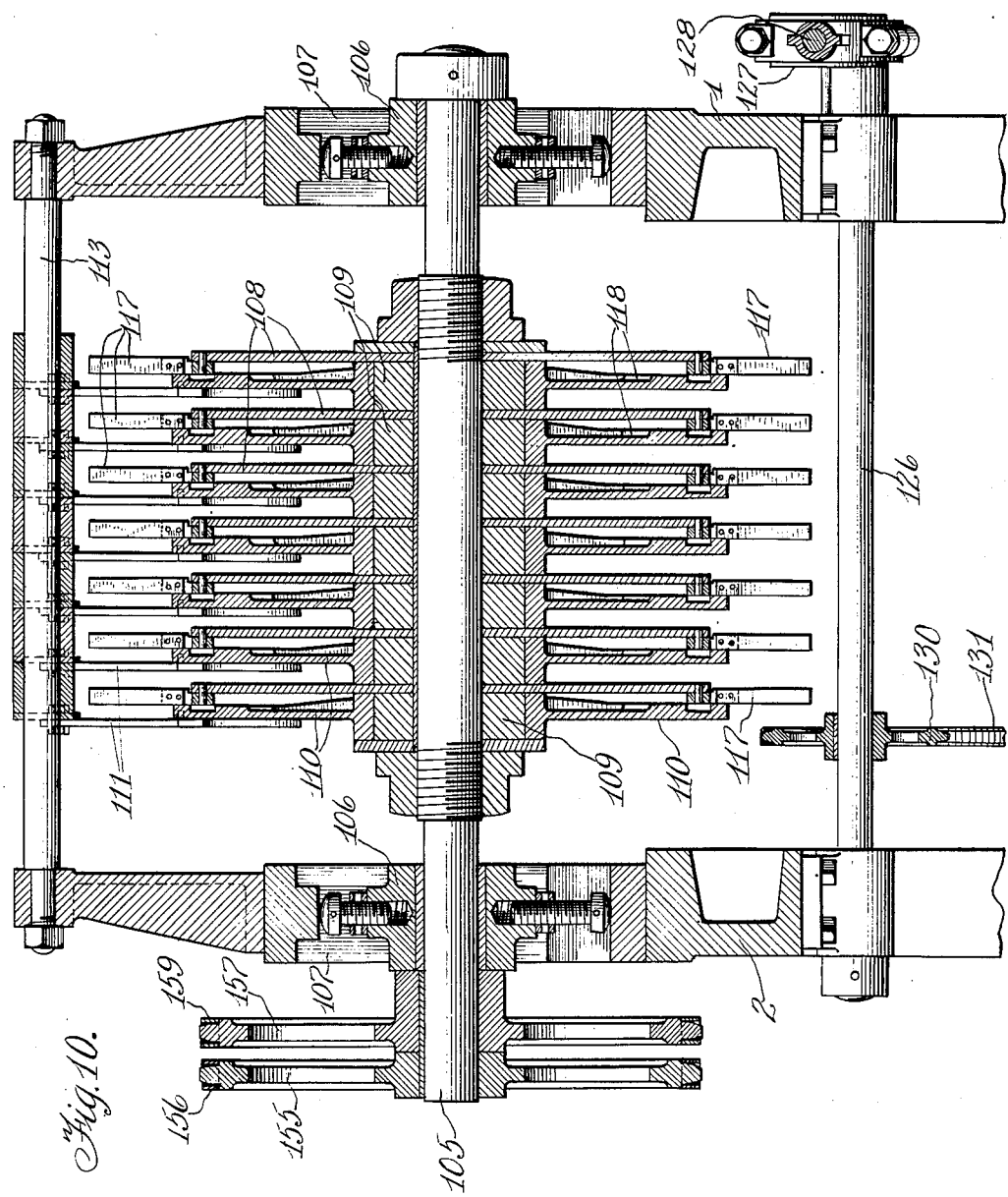

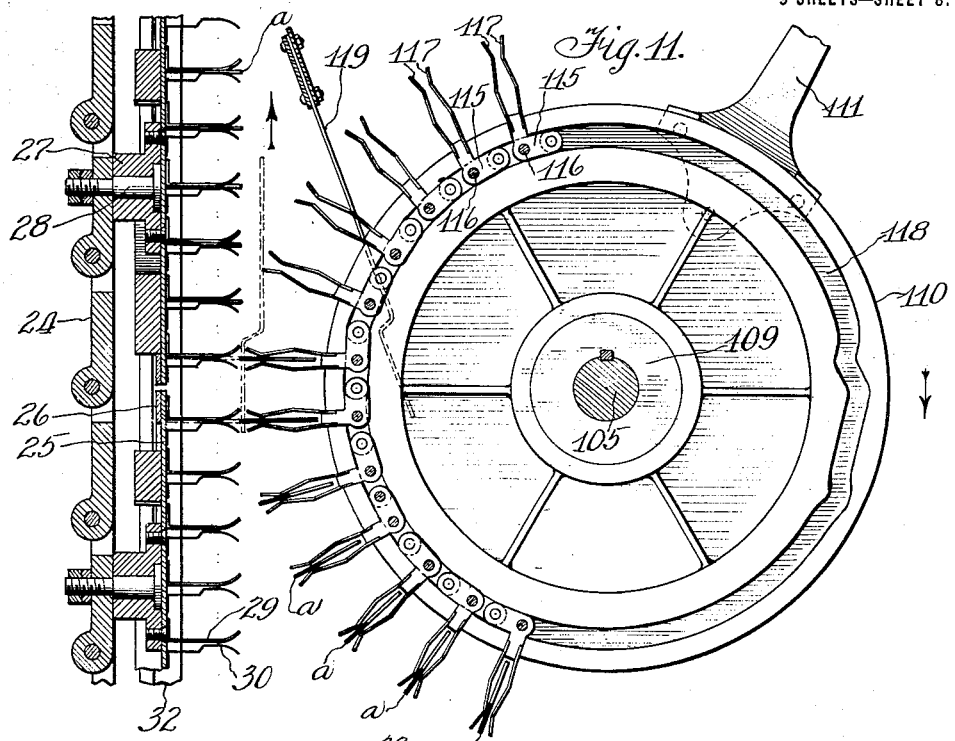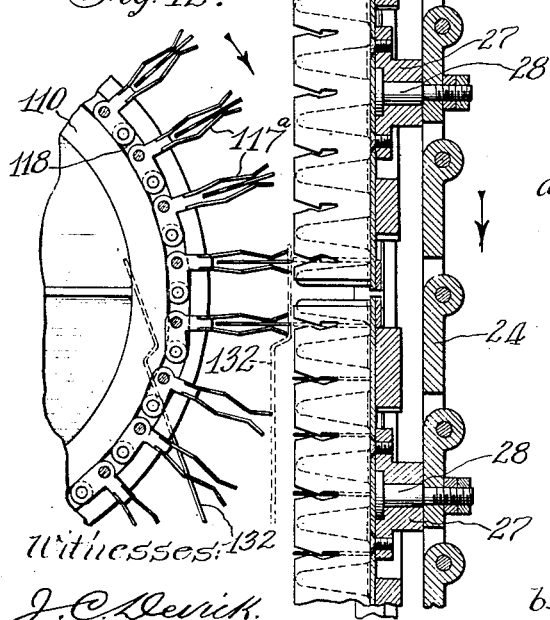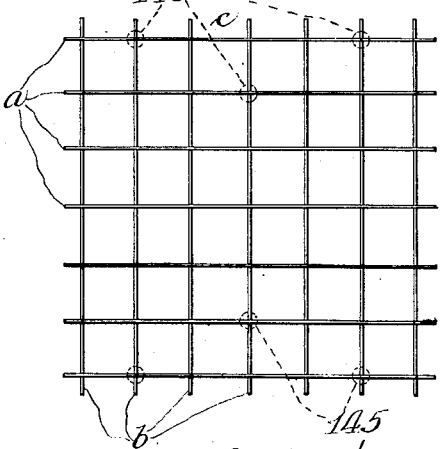

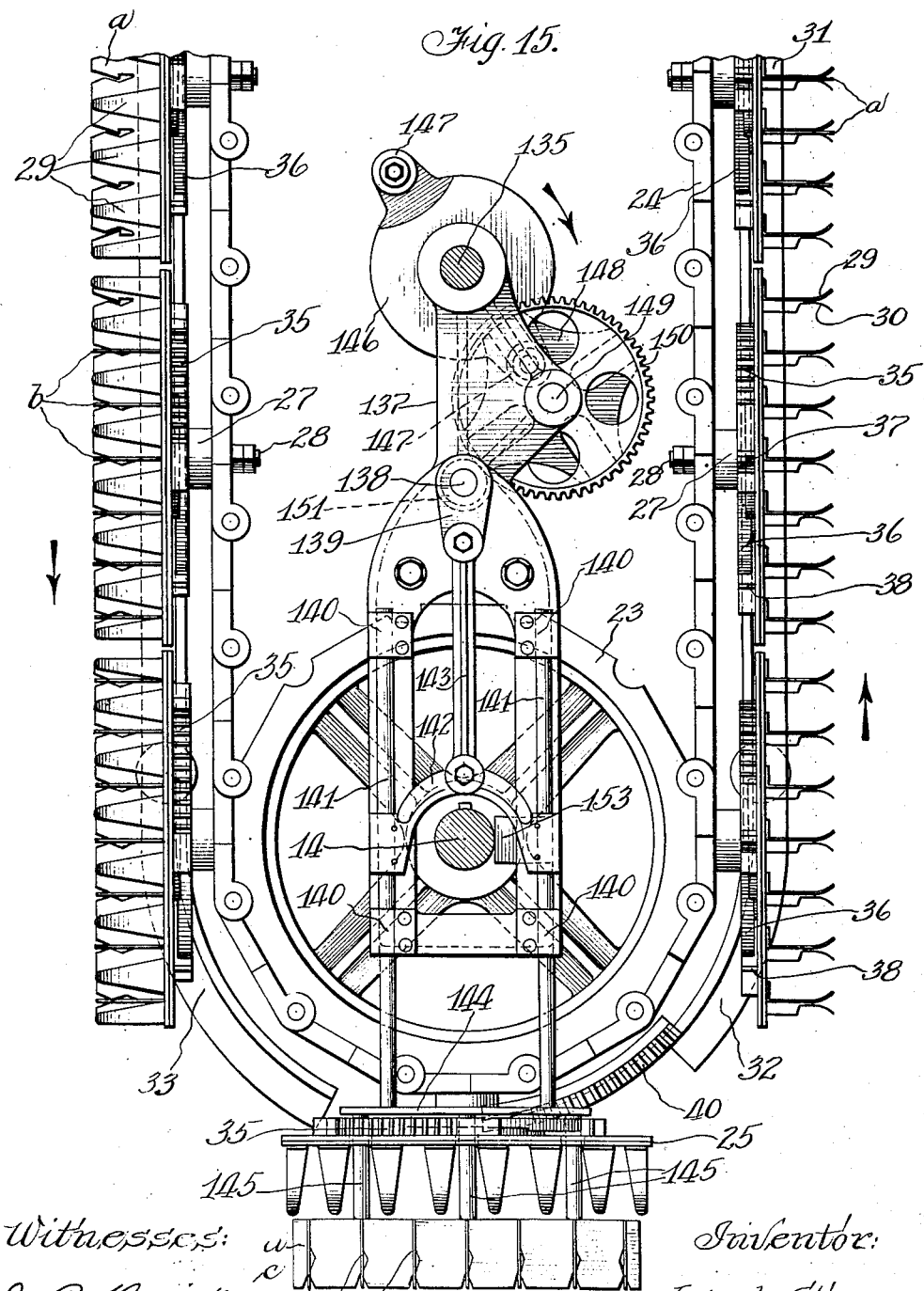

JOSEPH STARMAN, OF CEDAR RAPIDS, IOWA, ASSIGNOR TO NORTH STAR MANUFACTURING COMPANY, OF CHICAGO, ILLINOIS, A CORPORATION OF ILLINOIS.

CELL-CASE MACHINE.

1,199,505.  Specification of Letters Patent.  Patented Sept. 26, 1916.

Application filed January 6, 1911. Serial No. 601,149.

*To all whom it may concern:*

Be it known that I, JOSEPH STARMAN, a citizen of the United States, residing at Cedar Rapids, in the county of Linn and State of Iowa, have invented certain new and useful Improvements in Cell-Case Machines, of which the following is a specification.

This invention relates to automatic machines for manufacturing such fillers as are used, for example, in egg-cases.

The primary object of the invention, generally stated, is to increase the output of machines of the class referred to.

Egg-case fillers as ordinarily constructed are composed of intersecting strips of paper, the strips being cut from a web unwound from a roll, and the strips having slots punched therein so that they may be interlocked. In the machines heretofore used, a single web has been passed through the punching and shearing mechanism, said mechanism acting only upon the downstroke. The machine herein shown comprises a double-acting punching and shearing mechanism combined with means for passing two webs through said mechanism, the latter acting upon one web during the up-stroke and upon the other web during the down-stroke, whereby the capacity of the punching and shearing mechanism is doubled.

In machines heretofore employed, all or a portion of the mechanism for assembling the filler strips have had a reciprocatory or intermittent movement, the shock caused by the frequent and sudden stoppage and starting of the movements of the parts having materially limited the speed at which the entire machine may be run.

It is a feature of my invention to employ only continuously rotating parts for assembling the strips, whereby the speed at which the machine may be operated is greatly increased.

The machine hereinafter described comprises continuously rotated assembling devices which may be driven at high speed and a reciprocatory punching and shearing mechanism which, by reason of being double-acting, is adapted to serve the high-speed assembling mechanism without being itself actuated at excessively high speed.

Another object of the invention, as applied to a machine having an endless series of forms, is to improve the means for giving the forms a quarter-turn, whereby backlash is prevented and slippage of the filler strips in the forms obviated.

A further object of the invention is to improve the means for ejecting the completed fillers from the forms.

The invention also relates to constructional features contributing to durability, simplicity and compactness of the machine, and ease of adjustment for wear or for variations in the condition of the paper.

In the accompanying drawings, Figure 1 is a side elevation of a cell-case machine embodying the features of my invention. Fig. 2 is a top plan view of the machine. Fig. 3 is a vertical sectional view taken in the plane of dotted line 3 of Fig. 1. Fig. 4 is a fragmental side view of one end of the machine upon a scale larger than that used in Fig. 1. Fig. 5 represents one way of supporting the rolls of paper. Fig. 6 illustrates a brake for certain feed rolls comprised in the machine. Fig. 7 is a section through the punching mechanism on line 7 of Fig. 1. Fig. 8 is a longitudinal section through the parts shown in Fig. 4. Fig. 9 is a view in top plan showing the web being fed into the rotary strip conveyer. Fig. 10 is a vertical central section through said conveyer along the line 10 of Fig. 1. Fig. 11 illustrates the operation of inserting the first series of strips into the form. Fig. 12 represents the operation of interlocking the transverse series of strips with the first-mentioned strips. Fig. 13 is a plan view of the completed filler indicating the points at which the ejector engages the filler during the ejecting operation. Fig. 14 is a fragmental view of one of the strips composing the filler. Fig. 15 illustrates a portion of the endless series of forms, and the mechanism for ejecting the completed fillers from the forms.

A cell-case filler is ordinarily composed of fourteen strips of strawboard or like material, the strips being about 2¼ inches wide and about 11½ inches long. One series of seven strips *a* extends at substantially a right angle with seven strips *b* of the other series, the strips being slotted so as to intermesh and become locked together. The intersecting strips form cells 1¾ inches square. A completed filler is shown at *c* in Figs. 13 and 15.

The machine herein shown is adapted to manufacture such fillers as that just described from long webs of paper. It will, however, be understood that the dimensions set forth are merely illustrative and that machines embodying the present invention may be constructed to produce fillers of any desired size.

The machine comprises a plurality of forms each adapted to receive a series of parallel strips $a$, the strip-engaging devices of the form being arranged to support said series of strips spaced apart as they will be in the completed filler. A series of strips $a$ having been placed in the form, the latter is turned through a quarter revolution and a series of strips $b$ placed across the first mentioned strips, thus completing the filler.

The embodiment herein shown of the invention comprises an endless series of forms arranged centrally of the machine, means at one end of the machine for punching and severing strips $a$ of the first series, means for feeding webs of paper to said punching and severing means, means for conveying the punched strips to a point adjacent the path of the series of forms, means for transferring the strips from said conveyer to the forms, and similar means at the other side of the series of forms for producing strips $b$ of the other series from paper webs and for conveying said strips to and intermeshing them with the strips $a$.

In the illustrative embodiment herein shown, the framework of the machine comprises two side frames, 1 and 2. A main shaft 3 (see Figs. 2 and 7) is rotatably mounted in suitable bearings in said frame and in a bracket 4. Fixed to said drive shaft is a drive pulley 5 and a bevel gear 6, the latter meshing with a similar gear 7 which is fixed upon one end of a shaft 8 extending longitudinally of the machine and supported from the frame member 2. A spur gear wheel 9 meshes with a pinion 10 (see Figs. 1 and 2) fixed upon a worm shaft 11 supported in bearings upon the frame member 2. A worm 12 (Fig. 3) upon the shaft 11 meshes with a worm wheel 13 fixed upon a transverse shaft 14. The latter shaft is preferably mounted for vertical adjustment, as by providing the shaft with bearing boxes 15 arranged within recesses 16 in the frame members 1 and 2, said boxes being supported at the proper height by means of screws 17 threaded into said boxes and bearing against the top and bottom walls of said recesses. 18 are lock nuts for locking the screws in adjusted position. A shaft 19 is supported in the framework directly above the shaft 14 and parallel therewith. Preferably the shaft 19 is supported for vertical adjustment, and may be provided with adjustable bearing boxes 20 as in the case of the shaft 14. There is provided a suitable driving connection between the shafts 14 and 19 as, for example, a vertical shaft 21 supported in bearings upon the side frame member 1, said vertical shaft being connected to the transverse shafts 14 and 19 by means of bevel gears 22. The shafts 14 and 19 support the endless series of forms hereinbefore referred to. In the present illustrative embodiment, a chain wheel 23 is fixed upon each of said shafts, said chain wheels carrying an endless chain 24. The forms are rotatably mounted upon said chain. In this instance each form consists of a square sheet metal tray 25 provided upon its rear side with a strengthening frame 26, the trays being pivoted to the chain by means of supports 27 and pivot studs 28 (Fig. 11). Each tray bears a series of strip-supporting devices consisting in this instance of pairs of fingers 29 30 (Figs. 1, 3 and 11), there being seven rows of eight pairs of fingers in each row, the rows of fingers being 1¾ inches apart. The fingers 30 are of thin spring metal and are adapted to hold the strips between said fingers 30 and the fingers 29. While passing up one side of the conveyer and down the other, the forms are guided to move in a straight line, and are prevented from turning, by means of rails 31, 32, 33 34 fixed in the framework in the machine at opposite sides of the path of the forms, the end portions of said rails being curved to conform to the path of movement of the forms when passing around the chain wheels 23.

The means for giving the forms a quarter turn before said forms begin their downward movement and before they begin their upward movement comprises segments 35 and 36 (see Figs. 3 and 15) fixed upon the under side of each tray, each of said segments having a projection 37 38 upon one of its ends. To the upper end of the guide rail 34 is fixed a curved rack 39 (Figs. 1 and 2) adapted to mesh with the segments 35 upon the several forms; and to the lower end of the guide rail 32 is fixed a similar curved rack 40 (Fig. 15) adapted to mesh with the segments 36. As a form passes around the upper chain wheel 23 the projection 37 on the segment 35 strikes the end of the rack 39, and, as the chain continues moving, the form is swung through a quarter revolution on its pivot 28, the segment meshing with the rack during such movement. The quarter revolution thus imparted to the form turns the filler strips $a$ from the horizontal position which they heretofore occupied into a vertical position, ready to receive the transverse or second series of strips $b$. When said second series of strips has been interlocked with the first series of strips, and the form has reached the lowest point in its travel, and the completed filler has been ejected from the form, the latter is turned into position to receive another set of filler strips $a$, such turning being accomplished through the medium of the curved rack 40, the projection 38 and the segment 36.

In the present embodiment two strips $a$ are inserted into the form at one time, and two strips $b$ are likewise inserted at a time. The two rolls of paper from which the strips $a$ are formed may be supported in any suitable manner, as, for example, upon a rack 41 located conveniently to the righthand end of the machine (Figs. 1 and 5). The two webs unwound form the rolls of paper extend between two feed rolls 42 and 43 (Fig. 8), the lower roll being journaled in bearing boxes 44 which are adjustably mounted in guides 45 by means of screws 46. The upper roll is likewise journaled in boxes slidable in the guides 45 and is pressed downwardly by coiled springs 47 (Fig. 4). The upper roll may be raised to release the webs by means of a cam 48 loose on one of the journals of the roll 43 and provided with a handle 49 and arranged to operate against a portion 50 of the adjacent bearing box for the lower roll.

The upper roll 43 is driven in this instance by means of a sprocket chain 51 extending over sprocket wheels 52 and 53 fixed upon the shaft 3 and a journal of the upper feed roll, respectively, (Figs. 7 and 8). The lower roll is positively driven by means of a gear connection 54 55 (Figs. 2 and 4) with the upper roll. After passing through the feed rolls 42 and 43, the two webs pass over the guide rolls 56 and 57 and through guideways 58 (Fig. 8) to pairs of feed rolls 59 60 and 61 62. The feed rolls 59 60 61 62 are journaled in bearing boxes 63 (Fig. 4) which are adjustable in guides 64 in the framework. The bearing boxes for the feed rolls 59 and 62 are held in adjusted position by means of adjustable screws 65, and the rolls 60 and 61 are held against their companion rolls by means of a spring 66. The two pairs of feed rolls 59 60 and 61 62 are driven alternately by means herein shown as comprising a gear segment 67 pivoted at 68 and meshing with pinions 69 (Fig. 2) rotatably mounted upon the journals of the rolls 59 and 62. Fixed to each of said pinions is an arm 70 (Fig. 4) carrying a pawl 71 72 adapted to engage diametrically opposite teeth formed in collars 73 74 fixed to the journals of the rolls 59 and 62, the pawls 71 72 facing in opposite directions so that upon the upward movement of the gear segment 67 the lower set of feed rolls is driven, while upon the downward movement of the gear segment the upper pair of feed rolls is actuated. The gear segment may be swung by any suitable means; that herein shown by way of example comprises a lever 75 pivoted at 76, one end of said lever having pivoted thereto a rod 77 that extends loosely through a stud 78 rotatably connected to the gear segment 67. Collars 79 are adjustably fixed upon the rod 77 at opposite sides of the stud 78 by means of set screws 80. It will be seen that the collars 79 may be secured upon the rod 77 close to the stud 78 or at a greater or less distance from said stud, to regulate the extent of movement of the segment and thereby the extent of each feed movement of the webs. One end of the lever 75 is connected by means of a pitman 81 to a face plate 82 on the shaft 3. Said face plate has an undercut groove 83 therein (Fig. 7) to receive the T-head of the wrist pin 84 for the pitman 81. Said wrist pin is secured in place by means of a nut 85. It will be seen that the wrist pin 84 may be fixed at the desired distance from the center of the face plate 82, and thereby impart to the lever 75 the desired amplitude of oscillation.

To prevent overrunning or other casual movement of the feed rolls 59 60 61 62, I provide a brake of any suitable form for the rolls 59 and 62, as, for example, the brakes 86 acting upon the journals of said rolls.

The two sets of feed rolls 59 60 and 61 62 alternately advance the webs into a punching mechanism comprising in this instance a stationary framework 87 in which are fixed two stationary die plates 88 89 (Fig. 7) each provided with a stripper plate 90 91, the die plate 88 being supported above the die plate 89. A cross-head 92 is arranged between said die plates and carries punches 93. The cross-head is guided by means of guides 94 and is fixed to guide rods 95 which are slidably mounted in openings 96 in the framework 87. Eccentrics 97 are fixed upon the shaft 3 the straps 98 of said eccentrics having internally-threaded sockets 99 to receive screw-threaded rods 100 which are pivoted to yokes 101 connecting the lower ends of the guide rods 95 at opposite sides of the machine. Fixed to the inner edge of the cross-head 92 are two knife blades 102 and 103 adapted to coact with stationary shear blades 104 to sever the webs as the latter are alternately fed forward by the feed rolls 59 60 and 61 62. It will be seen that the punch and shearing mechanism acts upon the upward as well as on the downward stroke, thus utilizing a movement heretofore lost in cell-case machines of the prior art.

The material punched from the webs finds an exit through the passages 87$^a$ which may be connected, if desired, to an exhaust air system (not shown) for withdrawing the punchings.

The means for conveying the strips $a$ from the punching and shearing mechanism to the mechanism that inserts said strips into the form comprises a shaft 105 (Fig. 10) rotatably mounted in bearing boxes 106 which are adjustable in guides 107 fixed to the frame members 1 and 2, the boxes being secured in adjusted position by means similar to that employed for the bearings of the shafts 14 and 19. The shaft 105 is continuously rotated by means to be hereinafter described. Fixed upon said shaft are seven disks 108, which are spaced apart by means of collars 109. Upon each of the collars 109 is mounted a cam disk 110 held from rotation by means of an arm 111 connected by a link 112 to a cross-rod 113. The cam disks 110 are adjustable, each being held in position by means of a bolt 114 extending through the arm 111 and through an elongated opening in the link 112 (Fig. 1). The adjustable mounting of the shaft 105 and the cam disks 110 permits of the making of such adjustments as may be necessitated by wear, changes in the condition of the paper, etc.

Each of the disks 108 carries upon one face and adjacent to its periphery an annular series of bell cranks 115 each pivoted at 116 to its disk. One arm of each bell crank carries a pair of spring fingers 117 adapted to receive a filler strip $a$, while the other arm of the bell crank carries a roller stud lying within a cam groove 118 in the adjacent cam disk 110. The set of finger-carrying disks 108 is arranged between the shearing mechanism and the ascending side of the endless series of forms, the fingers 117 receiving the strips at the shearing mechanism and carrying them down and around to a point opposite the ascending forms. It will be understood that if the fingers were rigidly secured to the disks 108 in a radial position, the outer ends of said fingers would be quickly carried out of position to receive the strip. I therefore pivot the pairs of fingers 117 upon the disks 108, as heretofore described, and provide the cam disks 110 to suitably modify the movement of the fingers, the cam groove in said disks 110 being of such form that the outer ends of the fingers remain opposite the point of discharge of the strips long enough for said strip to be fed thereinto by the feed roller and before the strip is severed from the web by the shear. As shown in Fig. 8, the fingers swing downwardly out of a radial position as the fingers approach the receiving position. When the outer ends of the fingers reach the receiving position, the fingers swing upwardly as the disks 108 continue turning, such upward movement being just sufficient to compensate for the continuous movement of the disks and to maintain the fingers in receiving position for the necessary length of time. As shown in Fig. 8, one strip at a time is fed into the fingers 117. The portion of the cam groove adjacent to the form is of such shape as to bring two rows of fingers 117 carrying filler strips directly opposite and into alinement with two rows of fingers 29 30 upon the form, as shown in Fig. 11. As the form and the disks 108 continue moving, the fingers 117 swing downwardly sufficiently to keep the outer ends of the fingers 117 opposite the fingers 29 30 long enough to permit of the transfer of the strips from the conveyer fingers to the form fingers.

The means for removing the filler strips from the fingers 117 and pressing them into oppositely disposed rows of fingers upon the forms consists, in this instance, of six fingers 119 of spring steel or other suitable material, fixed upon a rock shaft 120 in the framework and extending in the spaces among the disks 108 and 110. The fingers 119 are arranged to be swung to push the filler strips out of the fingers 117 into the fingers 29 30 by means herein shown as comprising a crank arm 121 fixed to the rock shaft 120, a crank arm 122 fixed upon a short shaft 123, a rod 124 connecting said crank arms, a crank arm 125 fixed to said shaft 123, a shaft 126 in the supporting frame, an eccentric 127 upon one end of said shaft 126, a rod 128 connecting the crank arm 125 with the eccentric 127, sprocket wheels 129 and 130 fixed upon the shafts 3 and 126, respectively, and a chain 131 extending over said sprocket wheels.

The means for forming, feeding and inserting the strips $b$ comprise devices at the opposite side of the series of forms substantially identical with the described devices for forming, feeding and inserting the filler trips $a$, as indicated in Fig. 1. The filler strips $b$ are carried upward and over from the shearing mechanism to a position adjacent to the descending forms, and are there pushed onto the strips $a$ so as to interlock therewith, by means of fingers 132 similar to the fingers 119. While the strips are being inserted into the fingers 117$^a$ and while said strips are being interlocked with the strips on the form, the movements of said fingers are modified, as described in connection with the fingers 117, to compensate for the continuous movement of the parts. The fingers 132 are fixed to a rock shaft 133 which is rocked by means of a crank arm 134 and a rod 128$^a$ connecting said crank arm to an eccentric 127$^a$ upon a shaft 126$^a$.

The completed fillers $c$ are ejected from the forms by means to be now described, reference being had to Figs. 3 and 15: A shaft 135 is supported in bearings which are preferably adjustable, said shaft being driven in this instance from the shaft 21 by bevel gears 136. A bracket or framework 137 is loosely suspended from said shaft so that it may swing or yield, as will hereinafter appear. A shaft 138 is rotatably supported in the framework 137, and has cranks 139 fixed to its ends. Slidably mounted in guides 140 on the framework 137 are rods 141 which are connected by yokes 142 and pitmen 143 with the cranks 139. To the lower ends of the rods 141 are fixed plates 144 from which pins 145 project downwardly. The shaft 138 is intermittently rotated through successive complete revolutions by means of a Geneva stop motion consisting of a disk 146 fixed on the shaft 135, said disk carrying two diametrically opposite rollers 147 adapted to enter the four radial slots in the star wheel 148, the latter being fixed upon a shaft 149 carried by the framework 137. The shaft 149 is connected to the crank shaft 138 by means of a spur gear wheel 150 and a pinion 151.

Each of the trays 25 has openings 152 (Fig. 3) therein for the reception of the ejector pins 145 as the latter are projected downwardly to push the completed filler *c* out of the form. Said openings are somewhat larger in diameter than the pins 145 to provide clearance. The pins engage the filler at the intersections of the strips *a* and *b* as shown in Fig. 13. When a form bearing a completed filler reaches substantially the position shown in Fig. 15, the pins 145 are rapidly projected downwardly through the form and as rapidly elevated, the continuing movement of the form causing the framework 137 to swing a slight distance to the right. When the pins 145 have been withdrawn from the openings 152 the framework swings to the left under the action of gravity into its normal position, such position being determined by cushions 153 of leather, wood or other suitable cushioning material fixed to the framework in position to contact the shaft 14.

The two sets of conveyer disks are rotated by means of a sprocket wheel 154 (Fig. 3) fixed on the shaft 135, a sprocket wheel 155 carried by the shaft 105 of the disks for the strips *a*, a chain 156 extending about said wheels, sprocket wheels 157 158 fixed to the shafts 105 105ᵃ, respectively, and a chain 159 running over said wheels 157 158.

160 and 161 are idlers to take up slack in the chain belts 156 159.

The operation of the machine will be apparent from the foregoing description, and need not be here set forth.

I have herein described one embodiment of the invention with considerable particularity without intending thereby to limit the invention to the details set forth. It is obvious that the construction of the several mechanisms and their relative order or arrangement may be varied by those skilled in the art without departing from the spirit of the invention, and that various features may be used apart from others.

I claim as my invention:

1. In a cell-case machine, the combination of strip-forming means, continuously rotating means comprising pairs of spring fingers to receive strips from said strip-forming means, and means for swinging each pair of fingers as a unit to maintain it in receiving relation to the strip-forming means for the desired length of time.

2. In a cell-case machine, the combination of strip-forming means, a continuously rotating structure, an annular series of pairs of spring fingers upon the periphery of said structure arranged to receive strips from the strip-forming means as the fingers pass said means, and means for swinging each pair of fingers as a unit to maintain it in receiving relation to the strip-forming means for the desired length of time.

3. In a cell-case machine, the combination of reciprocatory strip-forming means, means for intermittently feeding a web through said strip-forming means, a continuously rotating structure adjacent to the strip-forming means and having a peripheral series of pairs of fingers adapted to receive the end of the web as the latter is fed forward intermittently, and means for swinging each pair of fingers as a unit to maintain it in receiving relation to the strip-forming means for the desired length of time.

4. In a cell-case machine, the combination of a continuously traveling series of forms, each adapted to hold the crossed strips constituting a filler, means for placing such strips in the forms, and relatively stationary means for successively ejecting the completed fillers from said forms as the latter travel past, a portion of said ejecting means being arranged to move a short distance with the forms during the ejecting operation.

5. In a cell-case machine, the combination of a continuously traveling series of forms, each adapted to hold the crossed strips constituting a filler, said forms being arranged to travel in an endless path about two horizontal axes located one above the other, and relatively stationary ejecting means mounted for swinging movement near the lower end of the series of forms and adapted to successively eject the completed fillers downwardly from said forms, a portion of said ejecting means swinging laterally to follow the movement of the forms during the ejecting operation.

6. In a cell-case machine, the combination of a pair of guide-wheels supported one above the other, an endless traveling series of forms mounted to run about said guide-wheels, means for continuously driving said series of forms, and ejecting means positioned between the vertical reaches of said series of forms, said ejecting means comprising a plurality of pins adapted to be projected downwardly through successive forms as they pass beneath the lower one of said guide-wheels, said pins being supported for oscillation as a whole independently of said guide wheels so as to be movable a short distance with the forms during the ejecting operation.

7. In a cell-case machine, the combination of strip-forming means, a rotary structure having thereon a peripheral series of pairs of fingers adapted to receive strips from said strip-forming means the fingers of each pair being stationary with relation to each other, and each pair of fingers, as a unit, being pivoted to said rotary structure, and a cam for swinging said pairs of fingers.

8. In a cell-case machine, the combination of strip-forming means, a rotary structure having thereon a peripheral series of pivoted pairs of fingers adapted to receive strips from said strip-forming means, the respective fingers in each of said pairs being relatively stationary, a stationary disk arranged concentric with said structure, said disk having a cam groove therein, and means connected with the fingers and traveling in said groove.

9. In a cell-case machine, the combination of strip-forming means, a plurality of disks secured together in spaced relation to rotate upon a common axis, each of said disks carrying a peripheral series of pivoted pairs of fingers adapted to receive strips from said strip-forming means, means for rotating said disks, and cams located between the disks and arranged to act upon said pairs of fingers.

10. In a cell-case machine, the combination of strip-forming means, an endless series of forms each form comprising a plate-like member having pairs of fingers adapted to support strips at right angles to said member, a rotary strip conveyer located between the strip-forming means and the series of forms, and means for transferring the strips from the conveyer to said pairs of fingers.

11. In a cell-case machine, the combination of strip-forming means, an endless series of forms, a rotary strip conveyer, located between the strip-forming means and the series of forms, and swinging means adapted to push the strips out of the conveyer and into the forms.

12. In a cell-case machine, the combination of a reciprocatory punching and shearing machanism adapted to punch and shear in both its up-stroke and its down-stroke, means to intermittently feed a web through said mechanism, and continuously actuated rotary assembling mechanism adapted to receive the end of the web as the latter is fed forward.

13. In a cell case machine, the combination of the double-acting reciprocatory punching and shearing mechanism, means for feeding material thereto, a continuously driven endless series of forms, and means intermediate the punching and shearing mechanism and the series of forms for transferring strips from said mechanism to said forms.

14. In a cell-case machine, the combination of a frame, and endless series of forms mounted thereon, means for moving the series of forms, a pair of gear segments secured to each form, and two segmental racks secured respectively at the top and bottom of said frame and adapted to engage said segments to turn the forms.

15. In a cell-case machine, the combination of a frame, an endless series of forms mounted thereon, guide rails on the frame adapted to cause the forms to move in a straight line at the sides of their travel, a pair of gear segments fixed to each form, and two segmental racks fixed to said guide rails at the top and bottom thereof respectively, said racks lying in the path of travel of said segments and being arranged to engage the segments to rotate the forms.

16. In a cell-case machine, the combination of an endless series of forms, a gear segment fixed to each form, a stationary segmental rack positioned adjacent to the path of movement of said gear segments, and a projection on each of said forms adapted to engage with a stationary part to swing the form and carry the gear segment thereon into mesh with said stationary rack.

17. In a cell-case machine, the combination of a frame, a pair of chain wheels mounted thereon, an endless chain running over said wheels, a series of forms pivotally mounted on said chain, a pair of gear segments fixed to each form, guide rails adapted to hold the forms straight in their travel, two segmental racks fixed respectively at opposite ends of said guide rails, and a projection on each of said segments adapted to engage one end of said racks to swing said gear segments into mesh with said racks and cause said forms to be rotated through a quarter turn.

18. In a cell-case machine, the combination of two chain wheels, an endless chain extending about said wheels, a plurality of forms pivoted to said chain, stationary rails arranged to guide said forms to move in a straight path in traveling from one chain wheel to the other, the ends of said rails being curved, a curved rack fixed to the upper end of one of said rails, a curved rack fixed to the lower end of one of the rails at the opposite side of the chain wheels, and two gear segments fixed to diagonally opposite portions of each form, each of said segments having a projection thereon adapted to contact the end of one of said racks, each segment being adapted to mesh with one of said racks.

19. In a cell-case machine, the combination of an endless series of traveling forms, a frame suspended with freedom to swing back and forth, a device comprising ejector pins adapted to pass through a form to eject the filler therefrom, a crank shaft mounted in said suspended frame, a connection between said crank shaft and said device, and means for rotating the crank shaft.

20. In a cell-case machine, the combination of a horizontally extending supporting framework, two transverse shafts supported one above the other, substantially midway of said framework, an endless series of forms supported by said shafts, a double-acting punching and shearing mechanism located adjacent to each end of said framework, means at each end of the framework for feeding two webs to the punching and shearing mechanism, a rotary strip conveyer located intermediate each punching and shearing mechanism and the series of forms, swinging means located adjacent to each of said conveyers for transferring two strips at a time from the conveyer to an adjacent form, means for turning the forms, and means for ejecting the completed fillers from the forms.

21. In a cell-case machine, the combination of a continuously moving endless series of forms, a reciprocatory punching and shearing mechanism adapted to form strips, means for feeding paper to said punching and shearing mechanism, and a continuously rotating device adapted to receive the strips from said punching and shearing mechanism and carry said strips to said forms.

22. In a cell-case machine, the combination of a pair of wheels, an endless chain running thereon, a series of forms mounted on said chain, and means for carrying strips to said forms comprising a continuously rotating device having strip holders thereon, and means for operating said holders to prolong the period of their registration with said form.

23. In a cell-case machine, the combination of a punching and shearing mechanism adapted to receive two sheets of paper and form strips therefrom, means for feeding two sheets of paper thereto, a series of forms, and means adapted to receive two strips at a time from said punching and shearing mechanism and transfer said strips to said forms.

24. In a cell-case machine, the combination of a continuously traveling endless series of forms, a punching and shearing mechanism adapted to receive two sheets of paper in separate planes, means for feeding two sheets of paper to said mechanism, a continuously rotating conveyer having strip holders thereon, and means for operating said strip holders to maintain them in prolonged register with the strip discharge points of said punching and shearing mechanism and with the respective strip holders on said forms, said conveyer being adapted to transfer two strips at a time from the punching and shearing mechanism to a form.

25. In a cell-case machine, a continuously traveling endless series of forms, each form comprising a plurality of rows of strip holders, a continuously rotating conveyer having a series of strip holders thereon, means for operating the last mentioned holders to maintain two rows of them in register with two rows of holders on a form, and means for transferring two strips at a time from the second mentioned holders to the first mentioned holders while in such register.

26. In a cell-case machine, the combination of a series of forms, a punching and shearing mechanism adapted to receive two sheets of paper in different planes and form strips therefrom, means for feeding two sheets to said mechanism, a conveyer adapted to receive two strips at a time from said punching and shearing mechanism and convey them to said forms, and means for moving two strips at a time from said conveyer into said forms.

27. In a cell-case machine, a continuously moving rotary device having a strip holder extending approximately radially thereof, strip receiving means adjacent to said device, and means for moving said strip holder to maintain it in register with said strip receiving means for a prolonged period of time.

28. In a cell-case machine, a conveyer comprising a series of stationary disks having cam grooves thereon, a series of interposed rotary disks, and an annular set of strip holding devices pivoted on each rotary disk, each of said devices having a part extending into the groove in the adjacent stationary disk.

29. In a cell-case machine, a traveling series of forms, a conveyer adapted to present strips to said forms, and means for transferring strips from said conveyer to said forms comprising a rock shaft, an arm fixed thereon, a crank on said shaft, a link fixed to said crank and means for reciprocating said link.

JOSEPH STARMAN.

Witnesses:
  H. H. CURTIS,
  HUBERT LEMKE.